United States Patent
Aramaki (10) Patent No.: US 8,884,960 B2
(45) Date of Patent: Nov. 11, 2014

(54) CONTROLLING DISPLAYED 3-D DEPTH BASED ON THE BRIGHTNESS OF THE SURROUNDING AREA AND/OR BASED ON THE BRIGHTNESS OF THE DISPLAY

(75) Inventor: Tatsuo Aramaki, Higashiyamato (JP)

(73) Assignee: NEC Corporation, Tokyo (JP)

( * ) Notice: Subject to any disclaimer, the term of this patent is extended or adjusted under 35 U.S.C. 154(b) by 1096 days.

(21) Appl. No.: 12/698,645

(22) Filed: Feb. 2, 2010

(65) Prior Publication Data

US 2010/0302237 A1 Dec. 2, 2010

(30) Foreign Application Priority Data

May 28, 2009 (JP) ................................. 2009-128500

(51) Int. Cl.
*G06T 15/50* (2011.01)
*H04N 13/04* (2006.01)
*H04N 13/00* (2006.01)
*H04M 1/725* (2006.01)

(52) U.S. Cl.
CPC ....... *H04N 13/0022* (2013.01); *H04N 13/0497* (2013.01); *H04M 1/72522* (2013.01)
USPC .......................................... 345/426; 345/419

(58) Field of Classification Search
CPC ................................ G06T 15/06; G06T 15/50
USPC ........................................................ 345/426
See application file for complete search history.

(56) References Cited

U.S. PATENT DOCUMENTS

| | | | | |
|---|---|---|---|---|
| 5,947,823 A | * | 9/1999 | Nimura | 463/32 |
| 6,456,283 B1 | * | 9/2002 | Ishida | 345/421 |
| 6,922,478 B1 | * | 7/2005 | Konen et al. | 382/115 |
| 2002/0067474 A1 | * | 6/2002 | Uomori et al. | 356/3.01 |
| 2003/0001838 A1 | * | 1/2003 | Han et al. | 345/419 |
| 2003/0202120 A1 | * | 10/2003 | Mack | 348/578 |
| 2003/0234785 A1 | * | 12/2003 | Matsuda et al. | 345/426 |
| 2005/0213204 A1 | * | 9/2005 | Kei | 359/383 |
| 2006/0210145 A1 | * | 9/2006 | Lee et al. | 382/154 |

FOREIGN PATENT DOCUMENTS

| | | |
|---|---|---|
| JP | 09-023451 | 1/1997 |
| JP | 11-237581 | 8/1999 |
| JP | 2004-289527 | 10/2004 |
| JP | 2005-270572 | 10/2005 |
| JP | 2006-229609 | 8/2006 |
| JP | 2007-037619 | 2/2007 |
| JP | 2007-104120 | 4/2007 |

* cited by examiner

*Primary Examiner* — Said Broome
(74) *Attorney, Agent, or Firm* — Cozen O'Connor (57) ABSTRACT

In a mobile phone 1, when three-dimensionally showing display information in a display section 17, a central controlling section 11 determines the 3D depth based on the brightness of the surrounding area detected by a surrounding brightness detecting section 24, determines the 3D depth based on the brightness of the display section 17, or determines the 3D depth based on the brightness of the surrounding area and the brightness of the display section 17, and shows the display information in the display section 17 with the determined 3D depth.

9 Claims, 10 Drawing Sheets

CONTROL DETAILS
WHEN DEPTH CONTROL CONDITION IS
SURROUNDING BRIGHTNESS AND DISPLAY
SECTION BRIGHTNESS

M4

| | | DISPLAY SECTION BRIGHTNESS | | | | |
|---|---|---|---|---|---|---|
| | | ~2 CANDELA | 2~200 CANDELA | 200~500 CANDELA | 500~1000 CANDELA | 1000 CANDELA ~ |
| SURROUNDING BRIGHTNESS | 10000 LUX~ | LEVEL 0 (2D) | | | | |
| | 2000~10000 LUX | LEVEL 1 | | | | |
| | 500~2000 LUX | LEVEL 2 | | | | |
| | 10~500 LUX | LEVEL 1 | LEVEL 2 | | | LEVEL 1 |
| | ~10 LUX | LEVEL 0 (2D) | LEVEL | LEVEL 2 | LEVEL | LEVEL 0 (2D) |

| ITEM | SETTING FLAG |
|---|---|
| SURROUNDING BRIGHTNESS | 1 |
| DISPLAY SECTION BRGHTNESS | 0 |
| SURROUNDING BRIGHTNESS AND DISPLAY SECTION BRIGHTNESS | 0 |

CONDITIONS

CONTROL DETAILS

WHEN DEPTH CONTROL CONDITION IS
SURROUNDING BRIGHTNESS

| SURROUNDING BRIGHTNESS | 3D DEPTH |
|---|---|
| 10000 LUX~ | LEVEL 0 (2D) |
| 2000~10000 LUX | LEVEL |
| 500~2000 LUX | LEVEL 2 |
| 10~500 LUX | LEVEL 1 |
| ~10 LUX | LEVEL 0 (2D) |

WHEN DEPTH CONTROL CONDITION IS
DISPLAY SECTION BRIGHTNESS

| DISPLAY SECTION BRIGHTNESS | 3D DEPTH |
|---|---|
| 1000 CANDELA~ | LEVEL 0 (2D) |
| 500~1000 CANDELA | LEVEL 1 |
| 200~500 CANDELA | LEVEL 2 |
| 2~200 CANDELA | LEVEL 1 |
| ~2 CANDELA | LEVEL 0 (2D) |

FIG. 5

CONTROL DETAILS
 WHEN DEPTH CONTROL CONDITION IS
 SURROUNDING BRIGHTNESS AND DISPLAY
 SECTION BRIGHTNESS

M4

| | | DISPLAY SECTION BRIGHTNESS | | | | |
|---|---|---|---|---|---|---|
| | | ~2 CANDELA | 2~200 CANDELA | 200~500 CANDELA | 500~1000 CANDELA | 1000 CANDELA~ |
| SURROUNDING BRIGHTNESS | 10000 LUX~ | LEVEL 0 (2D) | | | | |
| | 2000~10000 LUX | LEVEL 1 | | | | |
| | 500~2000 LUX | LEVEL 2 | | | | |
| | 10~500 LUX | LEVEL 1 | LEVEL 2 | | | LEVEL 1 |
| | ~10 LUX | LEVEL 0 (2D) | LEVEL | LEVEL 2 | LEVEL | LEVEL 0 (2D) |

FIG. 6

DISPLAY INFORMATION  M5

| INFORMATION ID | TITLE | TYPE | 3D DEPTH | ACTUAL DATA | ... |
|---|---|---|---|---|---|
| A01 | * * * * | STILL IMAGE | LEVEL 0 | * * * * | ... |
| A02 | * * * * | MOVING IMAGE | LEVEL 0 | * * * * | ... |
| A03 | * * * * | MOVING IMAGE | LEVEL 0 | * * * * | ... |
| A04 | * * * * | MOVING IMAGE | LEVEL 2 | * * * * | ... |
| | | | LEVEL 0 | * * * * | ... |
| A05 | * * * * | STILL IMAGE | LEVEL 2 | * * * * | ... |
| | | | LEVEL 1 | * * * * | ... |
| | | | LEVEL 0 | * * * * | ... |
| ... | ... | ... | ... | ... | ... |

CONTROLLING DISPLAYED 3-D DEPTH BASED ON THE BRIGHTNESS OF THE SURROUNDING AREA AND/OR BASED ON THE BRIGHTNESS OF THE DISPLAY

CROSS-REFERENCE TO RELATED APPLICATION

This application is based upon and claims the benefit of priority from the prior Japanese Patent Application No. 2009-128500, filed May 28, 2009, the entire contents of which is incorporated herein by reference.

BACKGROUND OF THE INVENTION

1. Field of the Invention

The present invention relates to a terminal device and a control program thereof for three-dimensionally showing display information in a display section.

2. Description of the Related Art

Conventionally, various techniques are used to three-dimensionally (hereinafter referred to as 3D, as required) display in a flat display section display information such as images (still images and moving images), text, and menus to enable users to stereoscopically view the display information.

As a technique such as this, for example, a technique is known in which an object in two-dimensional (hereinafter referred to as 2D, as required) display information can be viewed in 3D by a visual effect that makes the object appear three-dimensional being applied to the object. A technique using a polygon is an example of this technique.

A technique is also known that uses binocular disparity between the right eye and the left eye of the user. That is, in this technique, display information for the right eye and display information for the left eye that are slightly misaligned with each other are provided, and a parallax barrier that blocks light paths is placed in an appropriate position such that, when these two display information are simultaneously shown, the display information for the right eye is visible to the right eye but not to the left eye, and the display information for the left eye is visible to the left eye but not to the right eye. As a result, the display information appears three-dimensional.

All 3D display techniques described above use a parameter referred to as 3D depth that indicates the depth of 3D or the extent of outward projection. The greater the 3D depth is the deeper or more outwardly projecting the display information appears to the user. On the other hand, the smaller the 3D depth is, the shallower or less outwardly projecting the display information appears. When the 3D depth is zero, the display information appears two-dimensional (in other words, 2D display).

When display information is shown in the display section in 3D with a predetermined 3D depth (including 2D display in which the 3D depth is zero), a method is used in which a plurality of display information having the same content but different 3D depths are provided, and from among the plurality of display information, display information having the predetermined 3D depth is selected, and the selected display information is shown in 3D. Alternatively, a method is used in which 2D display information is converted to display information having the predetermined 3D depth, and the converted display information is shown in 3D. Also, various conditions are required for 3D display to be correctly recognized by the user, and these conditions are generally stricter than the conditions for a 2D display. For example, when the display section is dark and difficult to see, 3D display is more difficult to recognize than 2D display. In addition, the distance at which 3D display is correctly recognized (the distance between the user's eyes and a screen) is limited to a shorter range than the distance at which 2D display is correctly recognized.

Conventionally, to resolve conditions such as those described above, for example, a technology is disclosed as a technology enabling 3D depth to be switched by user operation in which the depth of stereoscopic viewing is changed, and viewing is switched between stereoscopic viewing and planar viewing by user operation (refer to, for example, Japanese Patent Application Laid-Open (Kokai) Publication No. 2007-037619).

However, in the conventional technology described above, there is a problem in that the user needs to operate to switch to an appropriate 3D depth every time the situation demands it. This operation is complicated and very taxing on the user.

SUMMARY OF THE INVENTION

The present invention has been conceived to solve the above-described problems. An object of the present invention is to actualize suitable display control in accordance with the situation upon display information being three dimensionally shown in a display section.

In order to achieve the above-described object, in accordance with one aspect of the present invention, there is provided a terminal device that three-dimensionally shows display information in a display section, comprising: a surrounding area detecting means for detecting brightness of a surrounding area; a determining means for determining a three-dimensional depth indicating a depth of three-dimension or an extent of outward projection of the display information shown in the display section based on the brightness of the surrounding area detected by the surrounding area detecting means; and a display controlling means for showing the display information in the display section with the three-dimensional depth determined by the determining means.

In accordance with another aspect of the present invention, there is provided a terminal device that three-dimensionally shows display information in a display section, comprising: a display section detecting means for detecting brightness of the display section; a determining means for determining a three-dimensional depth indicating a depth of three-dimension or an extent of outward projection of the display information shown in the display section based on the brightness of the display section detected by the display section detecting means; and a display controlling means for showing the display information in the display section with the three-dimensional depth determined by the determining means.

In accordance with another aspect of the present invention, there is provided a computer-readable storage medium having stored thereon a program that is executable by a computer to perform a process comprising: processing for detecting brightness of a surrounding area; processing for determining a three-dimensional depth indicating a depth of three-dimension or an extent of outward projection of display information shown in a display section based on the detected brightness of the surrounding area; and processing for showing the display information in the displaying section with the determined three-dimensional depth.

In accordance with another aspect of the present invention, there is provided a computer-readable storage medium having stored thereon a program that is executable by a computer to perform a process comprising: processing for detecting brightness of a display section; processing for determining a three-dimensional depth indicating a depth of three-dimension or an extent of outward projection of display information shown in the display section based on the detected brightness of the display section; and processing for showing the display information in the displaying section with the determined three-dimensional depth.

The present invention is highly effective in practical use in that suitable display control in accordance with the situation is achieved upon display information being three-dimensionally shown in a display section of a terminal device.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 7 is a flowchart showing an overview of overall operations of the mobile phone 1 side which start when the power is turned ON;

DETAILED DESCRIPTION OF THE PREFERRED EMBODIMENTS

The present invention will hereinafter be described in detail with reference to the preferred embodiments shown in the accompanying drawings.

Figure 1:
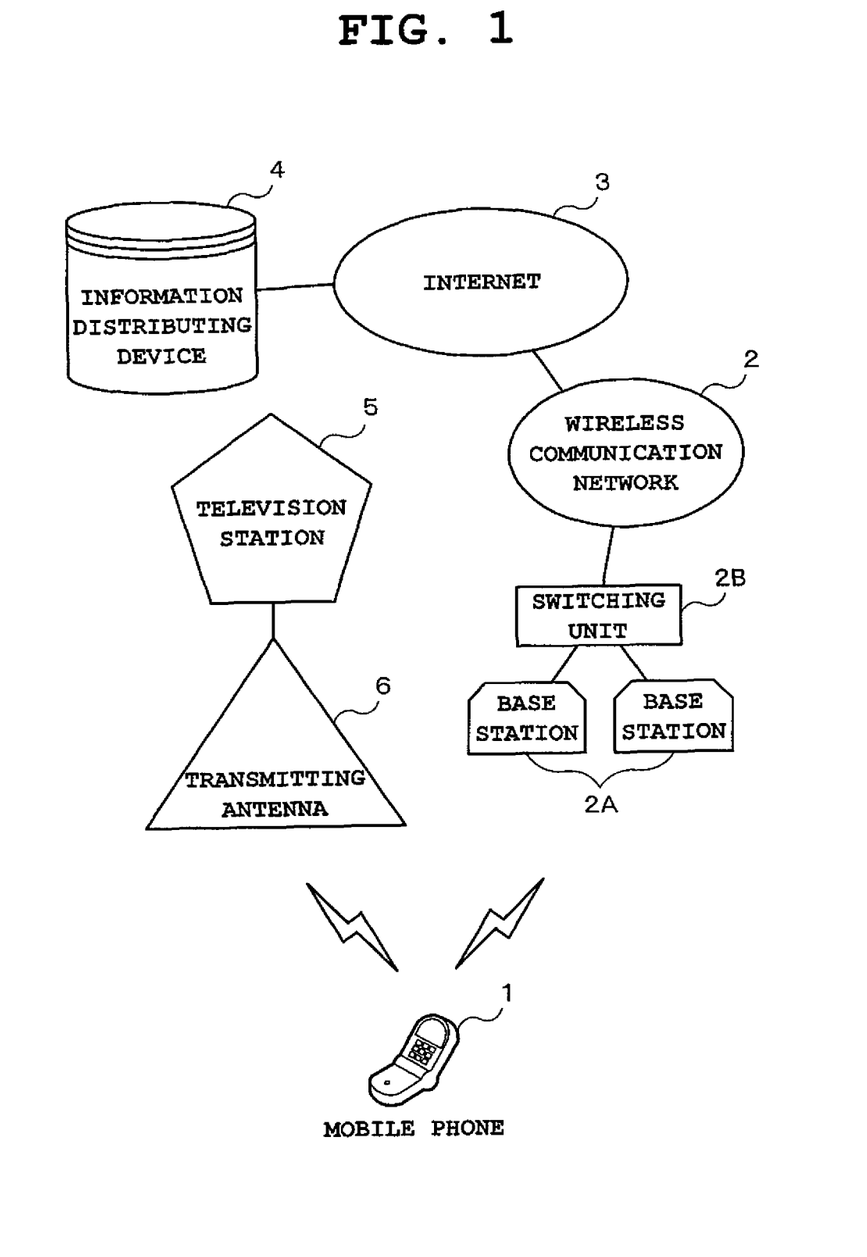
FIG. 1 is a block diagram showing a communication network system where a mobile phone to which an embodiment of the present invention has been applied can be used.

An embodiment shown in FIG. 1 to FIG. 10 is an example in which the present invention has been applied to a mobile phone as a terminal device. FIG. 1 is a block diagram of a communication network system where this mobile phone can be used.

A mobile phone 1 provides a call function, an electronic mail function, and an Internet connection function (web access function). In addition, the mobile phone 1 provides a television broadcast receiving function for receiving digital television broadcasts (such as one segment terrestrial digital television broadcasts), a three-dimensional (3D) display function, etc. The 3D display function shows display information such as moving images, still images, text, and menus with 3D depth indicating the depth of 3D or the extent of outward projection, using a parallax barrier method that takes advantage of binocular disparity between the left and right eyes.

When the mobile phone 1 is connected to a wireless communication network (mobile communication network) 2 from the nearest base station 2A and switching unit 2B, a connection can be established between the mobile phone 1 and another mobile phone 1 via the wireless communication network 2. Also, when the mobile phone 1 is connected to the Internet 3 via the wireless communication network 2, websites can be accessed and viewed. In addition, information such as moving images, still images, music, and news can be downloaded via the Internet 3 and the wireless communication network 2. The mobile phone 1 is capable of receiving terrestrial digital broadcasts transmitted from a television station 5 through a transmitting antenna 6, and receiving digital broadcasts such as Internet radio by downloading the digital broadcasts from an information distributing device 4 via the wireless communication network 2 and the Internet 3.

Figure 2:
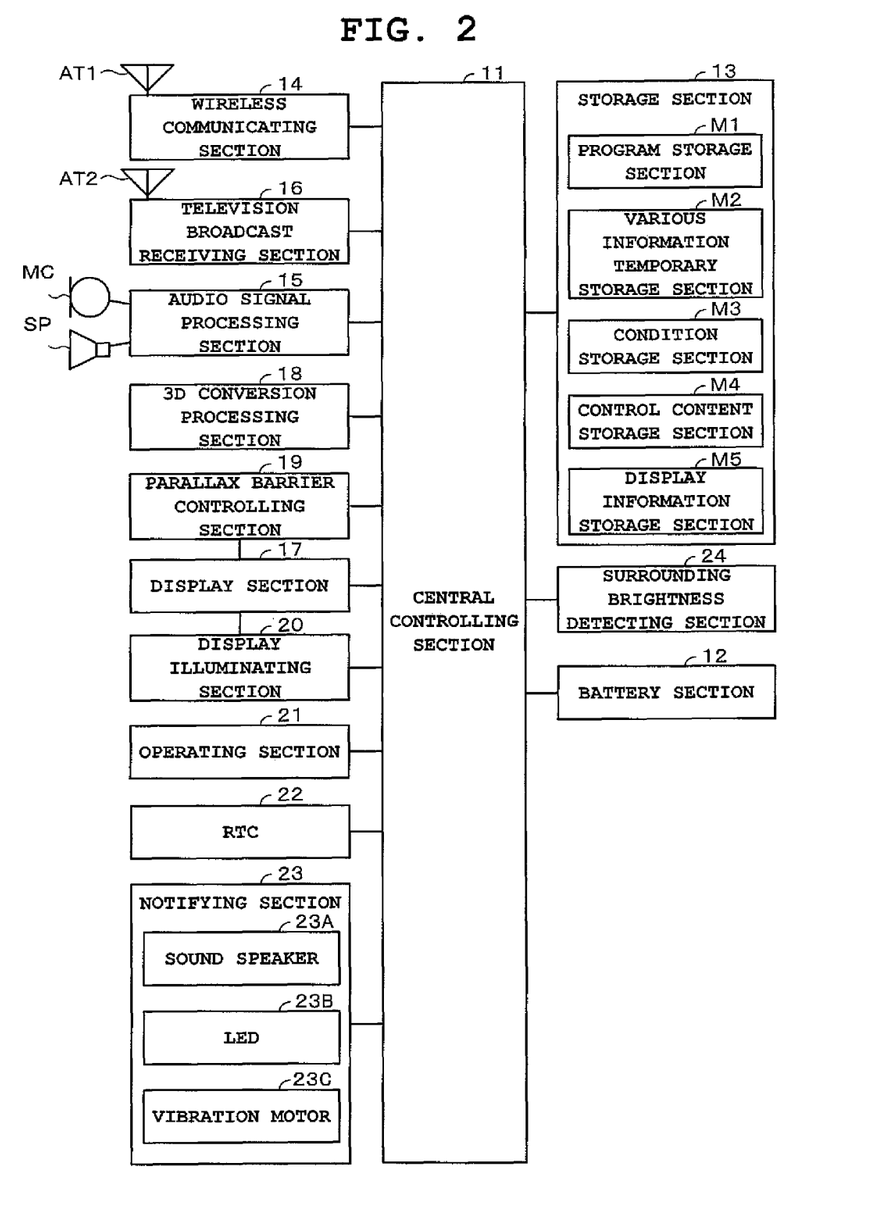
FIG. 2 is a block diagram showing basic components of a mobile phone 1.

FIG. 2 is a block diagram showing basic components of the mobile phone 1.

In FIG. 2, a central controlling section 11 operates using power supplied from a battery section 12 including a secondary battery, and includes a central processing unit, a memory, etc. The central processing unit controls overall operations of the mobile phone 1 based on various programs stored in a storage section 13, and this storage section 13 includes a program storage section M1, a various information temporary storage section M2, a condition storage section M3, a control detail storage section M4, a display information storage section M5, etc. The program storage section M1 stores therein programs, various applications, and the like for actualizing the embodiment in accordance with operation procedures shown in FIG. 7 to FIG. 10. The program storage section M1 also stores therein information and the like required by the programs and applications. The various information temporary storage section M2 is a work area temporarily storing therein various information required for the operation of the mobile phone 1, such as flag information, timer information, and screen information. The condition storage section M3, the control detail storage section M4, and the display information storage section M5 will be described in detail hereafter.

Here, the central controlling section 11 actualizes functions of a determining means, a display controlling means, a display section detecting means, and a judging means.

A wireless communication section 14 includes a wireless section, a baseband section, a demultiplexing section, etc. The wireless communication section 14 exchanges data with the nearest base station 2A during operation of, for example, the call function, the electronic mail function, or the Internet connection function. Specifically, when the call function is running, the wireless communication section 14 receives signals from the receiving side of the baseband section, and after demodulating the signals into received baseband signals, outputs the received baseband signals from a call speaker SP as audio, via an audio signal processing section 15. The wireless communication section 14 also receives, from the audio signal processing section 15, audio data inputted from a call microphone MC, and after encoding the audio data into transmission baseband signals, sends the encoded transmission baseband signals to a transmitting side of the baseband section, and transmits the encoded transmission baseband signals from an antenna AT1.

A television broadcast receiving section 16 is capable of receiving one segment terrestrial digital television broadcasts for communication terminal devices, as well as program information such as electronic program guides (EPG). This television broadcast receiving section 16 includes a receiving section (analog circuit section) and a digital circuit section. The receiving section extracts broadcast signals from an antenna AT2. The digital circuit section performs orthogonal frequency-division multiplexing (OFDM) demodulation on received broadcast signals, separates and decodes multiplexed broadcast signals into video, audio, and data (text data) signals, decompresses compressed data, etc. A display section 17 uses a high-definition liquid crystal display to show display information such as text information, wallpaper images, and television pictures, and a liquid crystal layer is provided on the surface of the display section 17 to generate a parallax barrier.

A 3D conversion processing section 18 generates display information for the right eye and display information for the left eye in accordance with 3D depth when a 3D display is performed. A parallax barrier controlling section 19 generates, when display information for the right eye and display information for the left eye generated by the 3D conversion processing section 18 are simultaneously shown in the display section 17 during 3D display, a parallax barrier in the surface layer of the display section 17 so that 3D display can be viewed correctly. A display illuminating section 20 is provided on the back surface side of the display section 17 to illuminate the display section 17 from the back surface. The display illuminating section 20 constitutes a backlight that illuminates a liquid crystal screen. The brightness of the illumination can be selectively set by user operation. The central controlling section 11 determines the 3D depth of display information shown in the display section 17 based on the brightness of illumination by the display illuminating section 20 (brightness of the display section 17), and shows the display information in the display section 17 in 3D. In other words, the central controlling section 11 controls the 3D depth of display information based on the brightness of the display section 17 (brightness of the screen).

An operating section 21 is used to perform dial-input, text-input, command-input, and the like, and the central controlling section 11 performs processing in accordance with input operation signals from the operating section 21. A real time clock module (RTC) 22 constitutes a clock section, and the central controlling section 11 acquires current date and time from the RTC 21. A notifying section 23 includes a sound speaker 23A, a light-emitting diode (LED) 23B, and a vibration motor 23C, and is driven for notification when an incoming call is received. The notifying section 23 is also driven during alarm notification and the like. A surrounding brightness detecting section 24 (surrounding area detecting means) is a luminometer (luminance sensor) that detects the brightness of the surrounding area of the mobile phone 1. The central controlling section 11 determines the 3D depth of display information shown in the display section 17 based on a detection result from the surrounding brightness detecting section 24, and shows the display information in the display section 17 in 3D. In other words, the central controlling section 11 controls the 3D depth of display information based on the brightness of the surrounding area.

Figure 3:
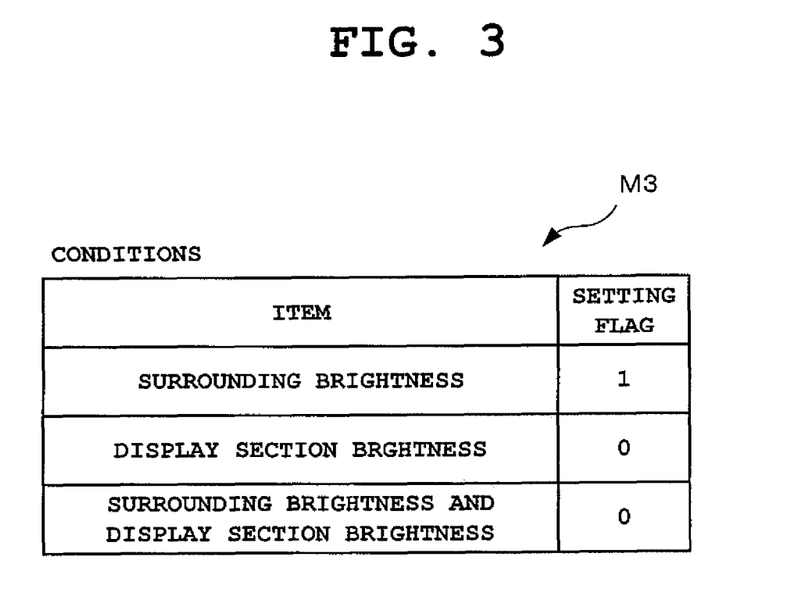
FIG. 3 is a diagram for explaining a condition storage section M3.

FIG. 3 is a diagram for explaining the condition storage section M3.

In FIG. 3, the condition storage section M3 stores therein a plurality of depth control conditions indicating under which condition the control is performed upon the 3D depth of display information being controlled. Each condition information includes an "item" and a "setting flag". The "item" indicates the types of depth control conditions which are "surrounding brightness", "display section brightness", and "surrounding brightness and display section brightness". The "surrounding brightness" is condition information indicating that the 3D depth of display information should be controlled based on the brightness of the surrounding area. Also, the "display section brightness" is condition information indicating that the 3D depth of display information should be controlled based on the brightness of the display section 17 (brightness of the screen).

The depth control condition "surrounding brightness and display section brightness" is condition information indicating that the 3D depth of display information should be controlled based on the brightness of the surrounding area and the brightness of the display section 17. The "setting flag" corresponding to each depth control condition is a flag indicating which condition is currently valid among the above-described plurality of depth control conditions, and is selectively set by user operation. In the example in FIG. 3, "surrounding brightness" of which the "setting flag" is set to "1" is indicated as a currently valid depth control condition.

Figure 4A:
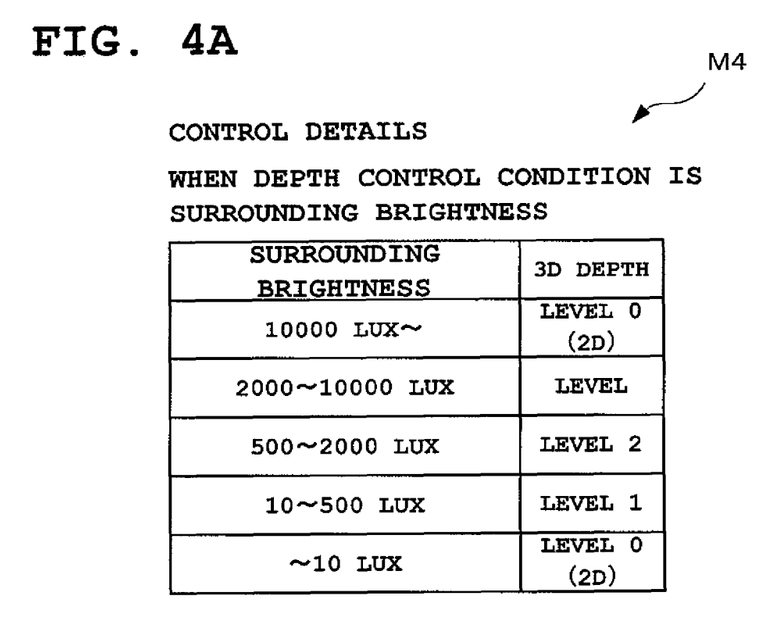
FIG. 4A is a diagram for explaining contents of a control detail storage section M4 corresponding to when the depth control condition is "surrounding brightness"
Figure 4B:
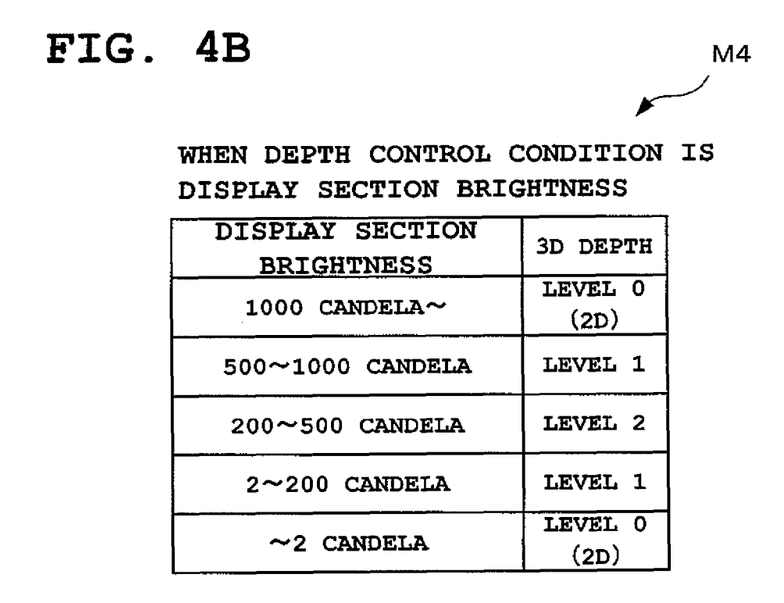
FIG. 4B is a diagram for explaining contents of the control detail storage section M4 corresponding to when the depth control condition is "display section brightness"
Figure 5:
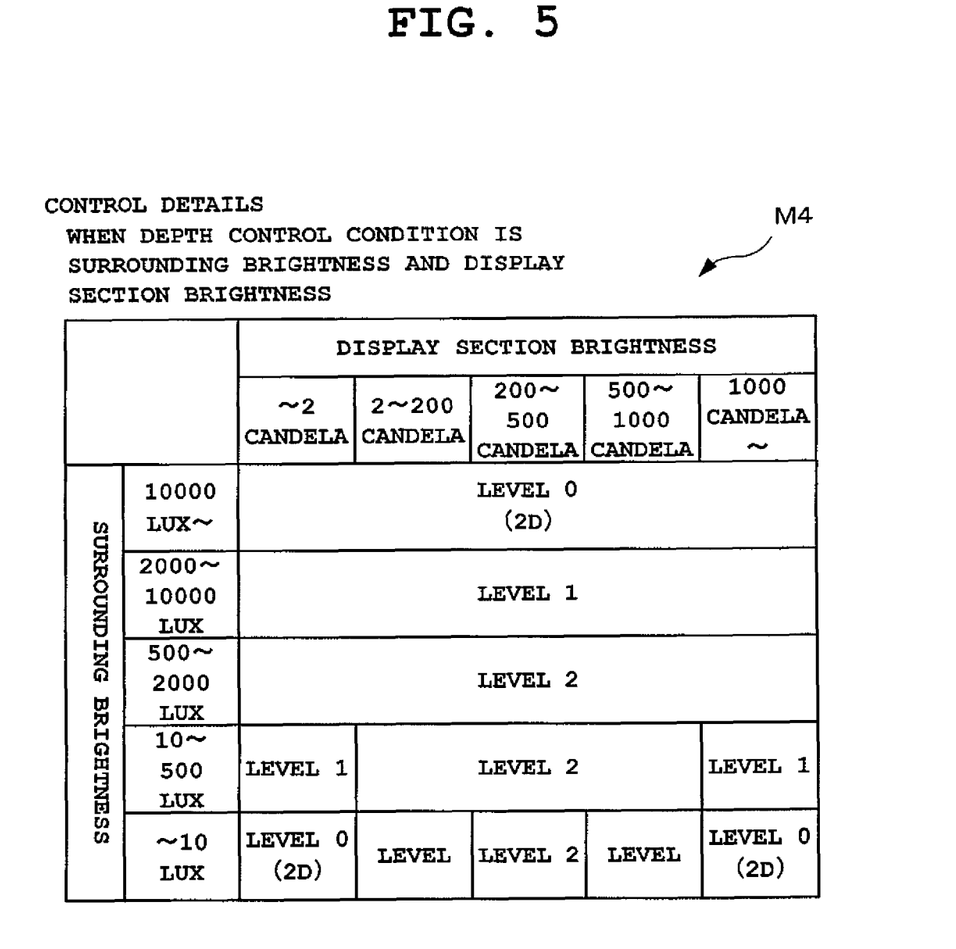
FIG. 5 is a diagram for explaining the contents of the control detail storage section M4 corresponding to when the depth control condition is "surrounding brightness and display section brightness"

FIG. 4A, FIG. 4B, and FIG. 5 are diagrams for explaining the control detail storage section M4.

In FIG. 4A, FIG. 4B, and FIG. 5, the control detail storage section M4 stores therein control details indicating what level of 3D depth is determined for each depth control condition, and these details can be selectively set by user operation. FIG. 4A shows contents of the control detail storage section M4 corresponding to when the depth control condition is the "surrounding brightness". The control detail storage section M4 in FIG. 4A is configured to associate "surrounding brightness (unit: lux)" and "3D depth (unit: level)". The "3D depth" indicates the depth of 3D or the extent of outward projection of display information, and is set to "level 2", "level 1", or "level 0 (2D)". The relationship of these levels are, in the order of depth from the strongest (greatest) depth, level 2>level 1>level 0 (2D). "Level 0 (2D)" indicates that the 3D depth is "level 0 (zero)" and the display information is in 2D (planar view).

Here, the relationship between the "surrounding brightness" and the "3D depth" has been established in consideration of the following. In the determination of the 3D depth based on the brightness of the surrounding area, when, for example, the brightness of the surrounding area is suitable for viewing the screen, such as in a brightly lit office, the 3D depth is determined to be the strongest (highest) level. When the surrounding area is brighter or darker than an optimal brightness, the 3D depth is determined to be a weak (low) level. When the surrounding area is too dark or too bright compared to an optimal brightness (predetermined brightness), the 3D depth is determined to be the weakest level (3D depth of zero).

In the example in FIG. 4A, "level 0 (2D)" is stored corresponding to "10000 lux or more". "Level 1" is stored corresponding to "2000 lux to 10000 lux". "Level 2" is stored corresponding to "500 lux to 2000 lux". "Level 1" is stored corresponding to "10 lux to 500 lux". "Level 0 (2D)" is stored corresponding to "up to 10 lux". Note that, for example, "2000 lux to 10000 lux" indicates that the surrounding brightness is 2000 lux or more and less than 10000 lux (the same applies hereinafter). Also, the brightness of the surrounding area is expressed in lux. However, another unit indicating brightness such as illuminance may also be used.

The relationship between the "surrounding brightness" and the "3D depth" is not limited to the above-described relationship. For example, the 3D depth may be strong when the brightness of the surrounding area is darker than a predetermined brightness. In other words, the relationship may be that in which the 3D depth becomes stronger as the surrounding area becomes darker. Also, conversely, the 3D depth may be strong when the brightness of the surrounding area is brighter than a predetermined brightness. In other words, the relationship may be that in which the 3D depth becomes stronger as the surrounding area becomes brighter. In the examples in the diagrams, the "3D depth" is expressed in levels. However, this is not limited thereto. For example, another unit such as millimeter may be used to express the "3D depth".

FIG. 4B shows contents of the control detail storage section M4 corresponding to when the depth control condition is "display section brightness". The control detail storage section M4 in FIG. 4B is configured to associate "display section brightness (unit: candela)" and "3D depth (unit: level)". In this instance as well, "level 2", "level 1", and "level 0 (2D)" are stored as the "3D depth". The relationship between the "display section brightness" and the "3D depth" is also similar to that of when the depth control condition is the "surrounding brightness". In other words, when the brightness of the display section 17 is suitable for viewing the screen, the 3D depth is determined to be the strongest level. When the display section 17 is brighter or darker than an optimal brightness, the 3D depth is determined to be a weak level. When the display section 17 is too dark or too bright compared to an optimal brightness, the 3D depth is determined to be the weakest level.

In the example in FIG. 4B, "level 0 (2D)" is stored corresponding to "1000 candela or more". "Level 1" is stored corresponding to "500 candela to 1000 candela". "Level 2" is stored corresponding to "200 candela to 500 candela". "Level 1" is stored corresponding to "2 candela to 200 candela". "Level 0 (2D)" is stored corresponding to "up to 2 candela". For example, "500 candela to 1000 candela" indicates that the display section brightness is 500 candela or more and less than 1000 candela (the same applies hereinafter). Also, the brightness of the display section 17 is expressed in candela. However, another unit indicating brightness such as illuminance may also be used.

FIG. 5 shows contents of the control detail storage section M4 corresponding to when the depth control condition is "surrounding brightness and display section brightness". The control detail storage section M4 in FIG. 5 is configured such that the vertical direction corresponds to "surrounding brightness", the horizontal direction corresponds to "display section brightness", and an intersection between the vertical column and the horizontal row correspond to "3D depth". In the example in FIG. 5, when the surrounding brightness is 500 lux or more, in the same manner as the control details shown in FIG. 4A, "level 0 (2D)" is stored as the 3D depth corresponding to "10000 lux or more" based on the surrounding brightness. Also, "Level 1" is stored corresponding to "2000 lux to 10000 lux", and "Level 2" is stored corresponding to "500 lux to 2000 lux". When the surrounding area is dark and the brightness is less than 500 lux, a plurality of 3D depths are stored so that the 3D depth can be determined in consideration of the brightness of the display section 17 in addition to the brightness of the surrounding area. In this instance, on the basis of whether or not the brightness of the surrounding area is less than 500 lux, the central controlling section 11 judges whether or not to control the 3D depth based on the brightness of the display section 17. When, as a result, the central controlling section 11 judges that the 3D depth is to be controlled based on the brightness of the display section 17, the central controlling section 11 determines the 3D depth based on the brightness of the display section 17.

Here, the relationship among the "surrounding brightness", "display section brightness", and "3D depth" may be established in consideration of the following. In general, when the surrounding area is dark and the display section 17 is backlit by the display illuminating section 20, the user can clearly recognize the display information when the brightness of the illumination is optimal. Therefore, the display information is shown with a strong 3D depth. However, when the illumination is too bright or too dark, the user cannot clearly recognize the display information. Therefore, the display information is shown with a weak 3D depth.

Accordingly, when the surrounding area is dim and the brightness is "10 lux to 500 lux", to control the 3D depth to the same level excluding when the display section 17 is dark and when the display section 17 is bright, "level 1" is stored corresponding to the display section brightness of "up to 2 candela" and "1000 candela or more", and "Level 2" is stored corresponding to the other ranges of brightness "2 candela to 200 candela", "200 candela to 500 candela", and "500 candela to 1000 candela". When the surrounding area is dark and the brightness is "up to 10 lux", to closely control the 3D depth based on the brightness of the display section 17, "level 0 (2D)" is stored corresponding to "up to 2 candela", "Level 1" is stored corresponding to "2 candela to 200 candela", "Level 2" is stored corresponding to "200 candela to 500 candela", "Level 1" is stored corresponding to "500 candela to 1000 candela", and "Level 0 (2D)" is stored corresponding to "1000 candela or more".

Figure 6:
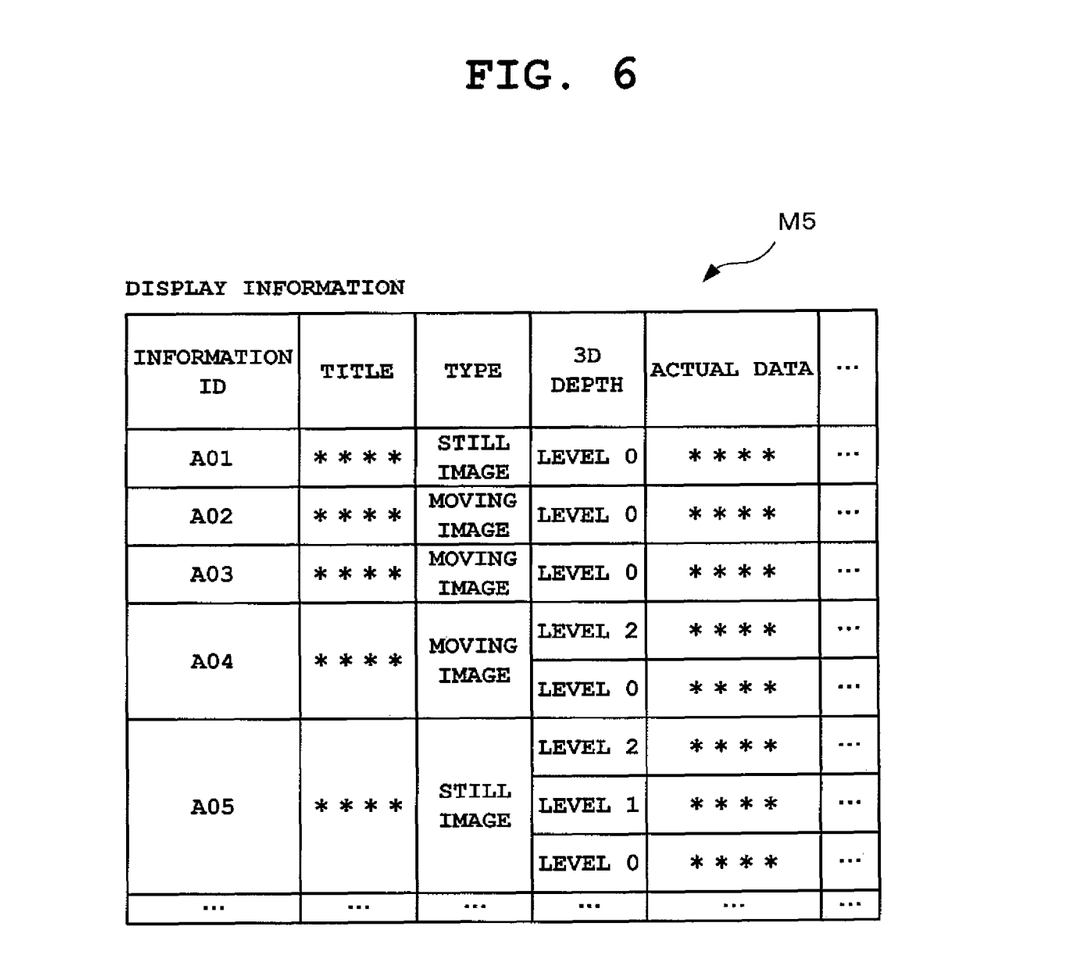
FIG. 6 is a diagram for explaining a display information storage section M5.

FIG. 6 is a diagram for explaining the display information storage section M5.

In FIG. 6, the display information storage section M5 stores therein display information to be shown in the display section 17. For example, information such as moving images, still images, music, and news downloaded from the information distributing device 4 via the Internet 3 and the wireless communication network 2, and recordings of broadcast programs received by the television broadcast receiving section 16 are stored as display information. The display information storage section M5 is configured to store therein a "title", a "type", a "3D depth", "actual data", and the like corresponding to an "information identifier (ID)" identifying display information. The "type" indicates information identifying the type of display information (such as a moving image, a still image, text, or a menu), and the "actual data" is actual data of display information. Some display information may only have actual data of which the "3D depth" is "level 0 (for 2D display)", and other display information may have actual data for each 3D depth. In other words, some display information may have actual data with the same content for each 3D depth (including 2D display), while other display information may only have actual data having a 3D depth of level 0 (2D display).

Next, the concept of operations of the mobile phone 1 according to the embodiment will be described with reference to flowcharts in FIG. 7 to FIG. 10.

Each function described in the flowcharts is stored in a readable program code format, and operations are sequentially performed in accordance with the program codes. In addition, operations in accordance with the program codes transmitted from a transmitting medium such as a network can also be sequentially performed. In other words, operations unique to the embodiment can be performed using programs and data provided from an external source via a transmitting medium, in addition to a recording medium.

Figure 7:
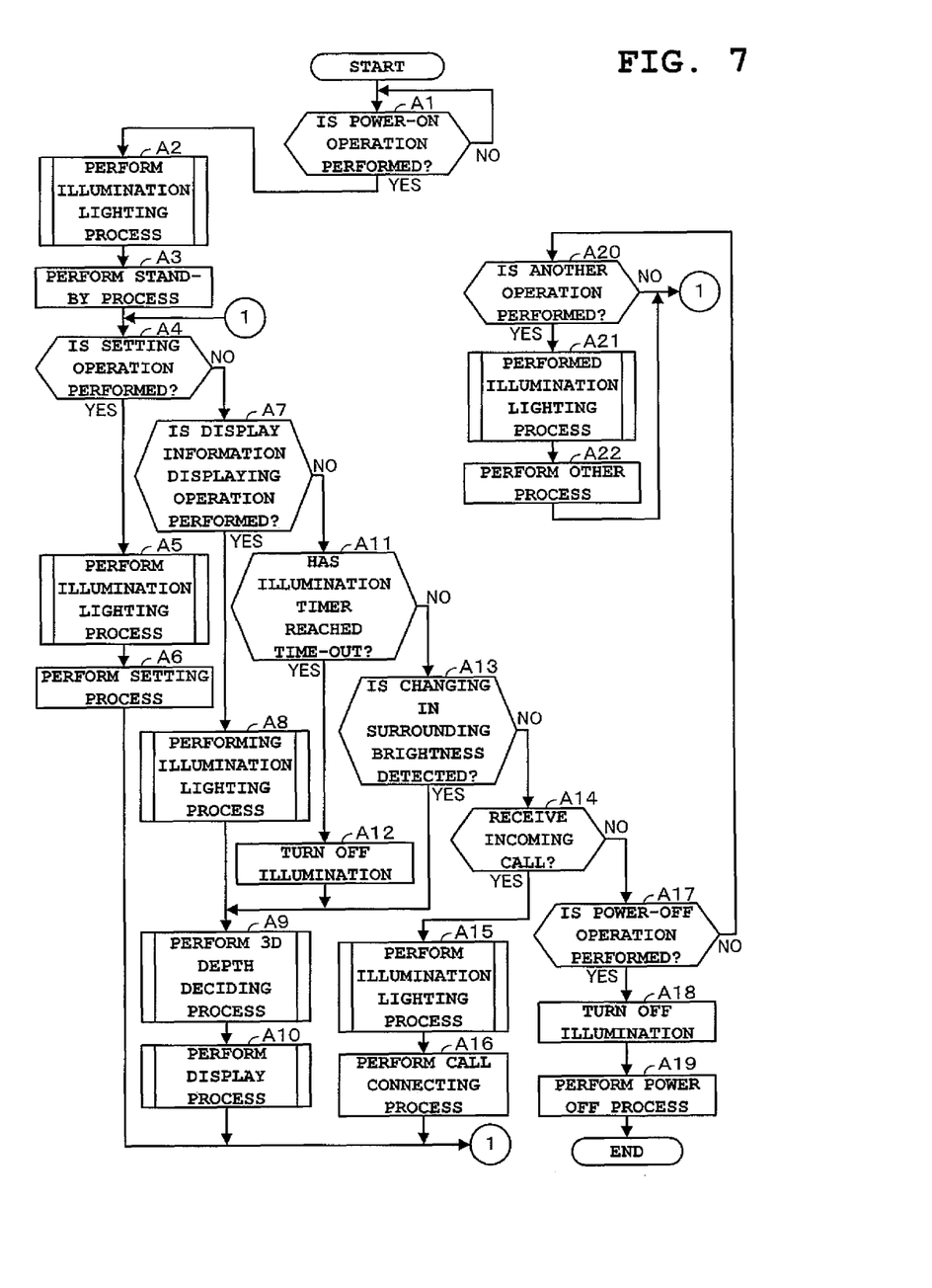

FIG. 7 is a flowchart showing an overview of overall operations of the mobile phone 1 side which start when the power is turned ON.

First, when a power-ON operation is performed to turn the power ON (YES at Step A1), the central controlling section 11 performs illumination lighting processing (described hereafter) to turn ON the display illuminating section 20 (Step A2), and then performs stand-by processing in which a predetermined wallpaper image is read out and shown, and communication is performed with the base station 2A and the position is registered (Step A3).

Figure 8:
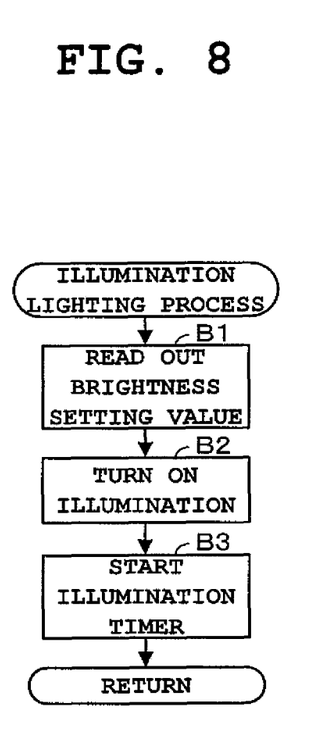
FIG. 8 is a flowchart showing details of an illumination lighting processing (Step A2 in FIG. 7 and the like)

FIG. 8 is a flowchart showing details of the illumination lighting processing (Step A2 in FIG. 7 and the like).

First, the central controlling section 11 reads out a setting value of the brightness of an illumination set in advance (Step B1), and after turning ON the display illuminating section 20 based on the setting value of the brightness of the illumination (Step B2), starts a time counting operation of an illumination timer (not shown) (Step B3). This illumination timer is, for example, a timer for power-saving measure that is used to measure whether or not a no-operation state in which no operation is performed has been continued for a predetermined time (such as 15 seconds) from when the display illuminating section 20 is turned ON. The central controlling section 11 turns OFF the display illuminating section 20 when the timer reaches time-out.

After performing the illumination lighting processing (Step A2 in FIG. 7) and the standby processing (Step A3) described above, the central controlling section 11 waits for an operation to be performed or for an incoming call. Here, when a setting operation for setting intended information is performed (YES at Step A4), the central controlling section 11 performs the above-described illumination lighting processing, and after starting the time counting operation of the illumination timer (Step A5), sets, for example, the display illuminating section 20, the condition storage section M3, the control detail storage section M4, or the display information storage section M5 as setting processing corresponding to the setting operation (Step A6). That is, the central controlling section 11 performs processing to set the brightness of backlight illumination in the display illuminating section 20, set the "setting flag" in the condition storage section M3, set the "3D depth" in the control detail storage section M4, or the like. Alternatively, the central controlling section 20 performs, for example, processing to download information, such as a moving image, a still image, music, or news from the information distributing device 4, or record a broadcast program received by the television broadcast receiving section 16, and store the downloaded information or recorded broadcast program in the display information storage section M5. When setting processing (Step A6) such as these is completed, the central controlling section 11 returns to above-described Step A4.

When a display information displaying operation is performed (YES at Step A7) or, in other words, when display information such as an image, text, or a menu is designated as a display subject by user operation, and an instruction to show the designated display information in the display section 17 is given, the central controlling section 11 performs the above-described illumination lighting processing, and after starting the time counting operation of the illumination timer (Step A8), performs 3D depth determination processing for controlling the 3D depth of this display information (Step A9), and proceeds to display processing for showing the display image in the display section 17 with the 3D depth determined by this determination processing (Step A10).

Figure 9:
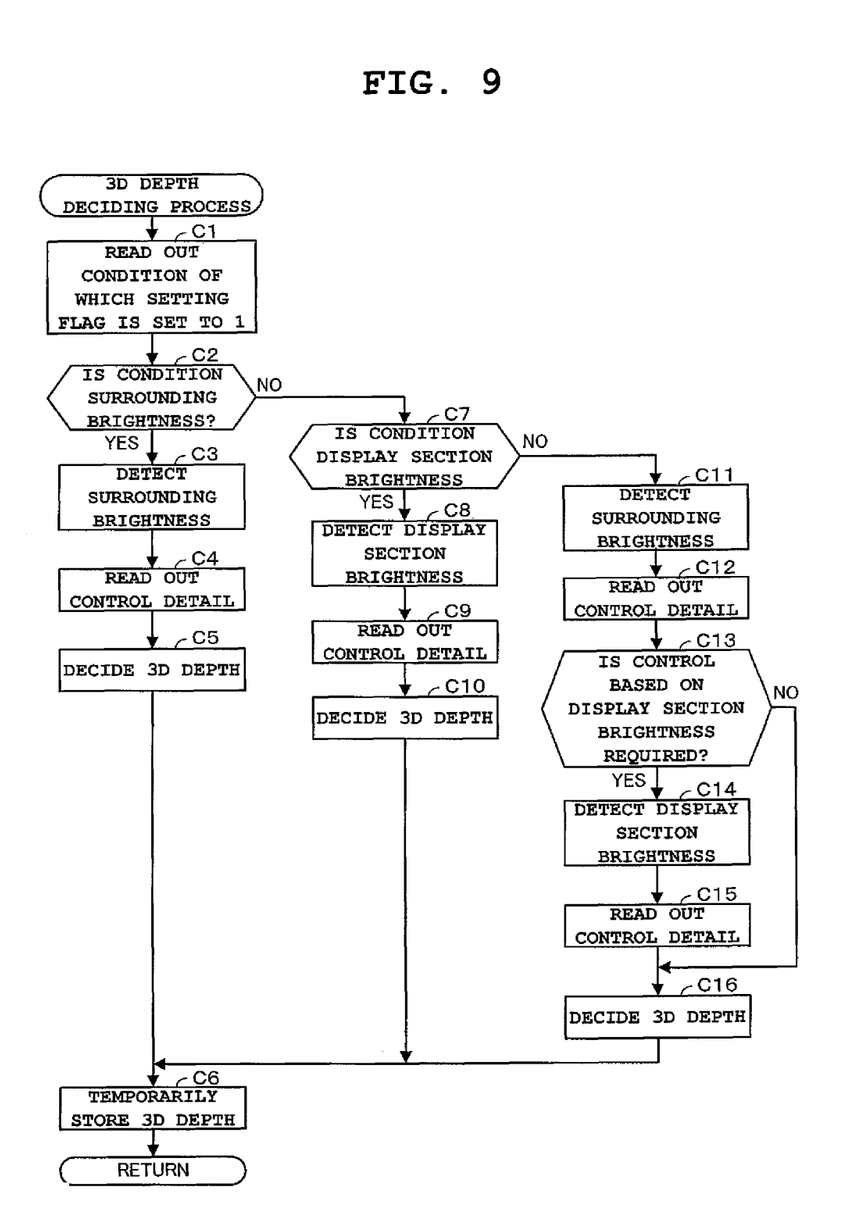
FIG. 9 is a flowchart showing details of 3D depth determination processing (Step A9 in FIG. 7)

FIG. 9 is a flowchart showing details of the 3D depth determination processing (Step A9 in FIG. 7).

First, the central controlling section 11 references the condition storage section M3 and checks whether or not the depth control condition of which the "setting flag" is "1" is "surrounding brightness" (Step C2), or is "display section brightness" or "surrounding brightness and the display section brightness" (Step C7). When the depth control condition of which the "setting flag" is "1" is the "surrounding brightness" (YES at Step C2), the central controlling section 11 acquires the brightness of the surrounding area detected by the surrounding brightness detecting section 24 (Step C3), and after referring to the control detail storage section M4 based on the acquired surrounding brightness, reads out the control detail corresponding to the surrounding brightness (Step C4).

That is, the central controlling section 11 refers to the control detail storage section M4 in FIG. 4A, and when the brightness of the surrounding area detected by the surrounding brightness detecting section 24 is "10000 lux or more", reads out "level 0 (2D)" as the corresponding control detail. When the surrounding brightness is "2000 lux to 10000 lux", the central controlling section 11 reads out "level 1", and when the surrounding brightness is "500 lux to 2000 lux", the central controlling section 11 reads out "level 2". When the surrounding brightness is "10 lux to 500 lux", the central controlling section 11 reads out "level 1", and when the surrounding brightness is "up to 10 lux", the central controlling section 11 reads out "level 0 (2D)". Then, after the read control detail is determined as the 3D depth for control (Step C5), the central controlling section 11 temporarily stores this 3D depth for control in the various information temporary storage section M2 (Step C6).

When the depth controlling condition of which the "setting flag" is "1" is the "display section brightness" (YES at Step C7), the central controlling section 11 detects the brightness of the display section 17 by the illumination state of the display illuminating section 20 (whether the illumination is ON or OFF, and how bright the illumination is) (Step C8). In this instance, when the display illuminating section 20 is ON, the central controlling section 11 detects the brightness of the display section 17 (brightness of the screen) by reading out the setting value of brightness from the display illuminating section 20. The central controlling section 11 then refers to the control detail storage section M4 based on the "brightness of the display section 17" and reads out the corresponding control detail (Step C9).

That is, the central controlling section 11 refers to the control detail storage section M4 in FIG. 4A, and when the display section brightness is "1000 candela or more", reads out "level 0 (2D)" as the corresponding control detail. When the display section brightness is "500 candela to 1000 candela", the central controlling section 11 reads out "level 1", and when the display section brightness is "200 candela to 500 candela", the central controlling section 11 reads out "level 2". When the display section brightness is "2 candela to 200 candela", the central controlling section 11 reads out "level 1", and when the display section brightness is "up to 2 candela", the central controlling section 11 reads out "level 0 (2D)". Then, after the read control detail is determined as the 3D depth for control (Step C10), the central controlling section 11 temporarily stores this 3D depth for control in the various information temporary storage section M2 (Step C6).

When the depth controlling condition of which the "setting flag" is "1" is the "surrounding brightness and display section brightness" (NO at Step C7), in the same manner as at above-described Step C3 and Step C4, the central controlling section 11 detects the surrounding brightness (Step C11), and after referring to the control detail storage section M4 based on the brightness of the surrounding area, reads out the corresponding control detail (Step C12). The central controlling section 11 then checks whether control based on the brightness of the display section 17 is required (Step C13). That is, the central controlling section 11 refers to the control detail storage section M4 in FIG. 5 and judges whether a plurality of 3D depths corresponding to the surrounding brightness has been stored or a single 3D depth corresponding to the surrounding brightness has been stored, and thereby judging whether or not control based on the brightness of the display section 17 is required in addition to that based on the brightness of the surrounding area. In this instance, in the control detail storage section M4 in FIG. 5, a plurality of 3D depths has been stored for a surrounding brightness of less than 500 lux, and a single 3D depth has been stored for a surrounding brightness of 500 lux or more. Therefore, the central controlling section 11 judges whether or not control based on the display section brightness is required, on the basis of whether the surrounding brightness is less than 500 lux, or 500 lux or more.

Here, when the central controlling section 11 judges that control based on the display section brightness is not required (NO at Step C13), the central control section 11 determines as the 3D depth for control the control detail read from the control detail storage section M4 shown in FIG. 5 based on the surrounding brightness (Step C16), and temporarily stores this 3D depth for control in the various information temporary storage section M2 (Step C6). When the central controlling section 11 judges that control based on the display section brightness is required (YES at Step C13), in the same manner as at above-described Step C8 and Step C9, the central controlling section 11 detects the brightness of the display section 17 (Step C14), and after referring to the control detail storage section M4 based on the brightness of the display section 17, reads out the corresponding control detail from the control detail storage section M4 in FIG. 5 (Step C15).

For example, in a case where the surrounding area is dim and the brightness is "10 lux to 500 lux", when the brightness of the display section 17 is "up to 2 candela" or "1000 candela or more", the central controlling section 11 reads out "level 1", and when the brightness of the display section is "2 candela to 200 candela", the central controlling section 11 reads out "level 2". in a case where the surrounding area is dark and the brightness is "up to 10 lux", when the brightness of the display section 17 is "up to 2 candela", the central controlling section 11 reads out "level 0 (2D)", and when the brightness of the display section 17 is "2 candela to 200 candela", the central controlling section 11 reads out "level 1". When the brightness of the display section 17 is "200 candela to 500 candela", the central controlling section 11 reads out "level 2". Then, after the read control detail is determined as the 3D depth for control (Step C16), the central controlling section 11 temporarily stores this 3D depth for control in the various information temporary storage section M2 (Step C6).

Figure 10:
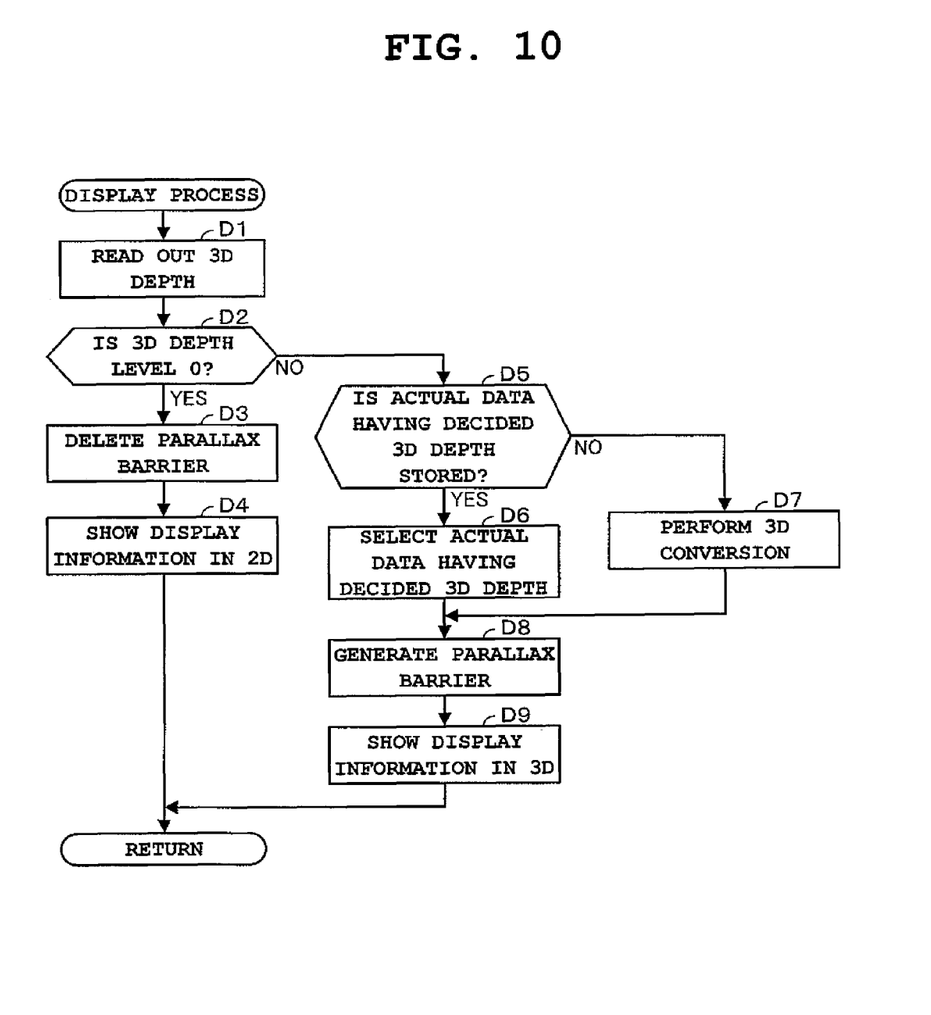
FIG. 10 is a flowchart showing details of display processing (Step A10 in FIG. 7).

FIG. 10 is a flowchart showing details of the display processing (Step A10 in FIG. 7).

First, the central controlling section 11 reads out the 3D depth temporarily stored in the various information temporary storage section M2 in the above-described 3D depth determination processing (Step D1), and checks whether or not the 3D depth is "level 0" (Step D2). When the 3D depth is "level 0" and 2D (planar viewing) is indicated (YES at Step D2), the central controlling section 11 shows in 2D the display information designated as the display subject by the above-described display information displaying operation. At this time, if the parallax barrier has been generated on the surface of the display section 17, the parallax barrier is deleted (Step D3), and then the central controlling section 11 shows the designated display information in the display section 17 in 2D (Step D4).

When the "3D depth" is not "level 0" (NO at Step D2), the central controlling section 11 searches the display information storage section M5 based on the "3D depth" of the display information, and checks whether or not corresponding "actual data" has been stored (Step D5). Here, some display information may only have actual data having a "3D depth" of "level 0", and other display information may have "actual data" for each 3D depth. Therefore, as a result of checking whether or not "actual data" having the "3D depth" has been stored, if relevant "actual data" is found (YES at Step D5), the central controlling section 11 reads out the "actual data" (Step D6). That is, the central controlling section 11 selects and reads out the "actual data" associated with the determined "3D depth", and shows the display information having the selected "actual data" in 3D. At this time, the central controlling section 11 shows the display information in the display section 17 in 3D (Step D9) after generating a parallax barrier in the surface layer of the display section 17 (Step D8).

When the "actual data" has not been stored (NO at Step D5) or, in other words, when only "actual data" having a 3D depth other than the determined 3D depth (such as "actual data" having a 3D depth of "level 0") has been stored, in order to convert the "actual data" having the other 3D depth to 3D display information having the determined 3D depth, the central controlling section 11 generates display information for the right eye and display information for the left eye in accordance with the determined 3D depth (Step D7). Then, after generating a parallax barrier in the surface layer of the display section 17 (Step D8), the central controlling section shows the display information in the display section 17 in 3D (Step D9). In other words, when the "actual data" having the relevant "3D depth" has not been stored, the central controlling section 11 converts the "actual data" having a 3D depth other than the determined 3D depth into 3D display information having the determined 3D depth, and shows the 3D display information in 3D.

In this way, the 3D depth determination processing (Step A9 in FIG. 7) and the display processing (Step A10) are performed in response to the display information displaying operation. Also, when the above-described illumination timer reaches time-out (YES at Step A11), the brightness of the display section 17 changes as a result of the display illuminating section 20 being turned OFF (Step A12). Therefore, the central controlling section 11 performs the above-described 3D depth determination processing (Step A9 in FIG. 7) and display processing (Step A10), and shows the display information with a 3D depth determined based on the brightness after the illumination is turned OFF.

In addition, the central controlling section 11 also determines whether or not the surrounding brightness has changed by comparing a detection result (current detection result) from the surrounding brightness detecting section 24 with a preceding detection result (Step A13). Here, when a change in the surrounding brightness is detected (YES at Step A13), the central controlling section 11 performs the above-described 3D depth determination processing (Step A9) and display processing (Step A10), and shows the display information with a 3D depth determined based on the changed surrounding brightness. Note that this procedure is not limited to when a change in the surrounding brightness is detected as described above. The central controlling section 11 may periodically detect the surrounding brightness, and perform the 3D determination processing (Step A9) and the display processing (Step A10).

On the other hand, when an incoming call is detected (YES at Step A14 in FIG. 7), the central controlling section 11 performs the above-described illumination lighting processing, and after starting the time counting operation of the illumination timer (Step A15), performs call connection processing for establishing the line (Step A16) and returns to above-described Step A4. When a power-OFF operation is performed (YES at Step A17), the central controlling section performs the above-described illumination lighting processing, and after starting the time counting operation of the illumination timer (Step A18), performs power-OFF processing (Step A19), and the flow in FIG. 7 is completed. When another operation is performed (YES at Step A20), the central controlling section 11 performs the above-described illumination lighting processing, and after starting the time counting operation of the illumination timer (Step A21), performs, for example, display deleting processing for deleting contents shown in the display section 17, outgoing call processing, or mail transmitting processing as processing in accordance with the operation (Step A22), and then returns to above-described Step A4.

As described above, according to the embodiment, when showing display information in the display section 17 in 3D, the central controlling section 11 determines the 3D depth of the display information based on the surrounding brightness, and shows the display information in the display section 17 with the determined 3D depth. Therefore, the present invention is highly effective in practical use in that appropriate display control is actualized based on the surrounding brightness.

Specifically, the following effects are achieved.

Since the 3D depth of display information is determined based on the brightness of the surrounding area and the brightness of the display section 17, the 3D depth can be determined in consideration of not only the brightness of the surrounding area but also the brightness of the screen. As a result, the display information is shown with a suitable 3D depth based on the brightness of the surrounding area and the brightness of the screen.

In a case where the surrounding brightness is darker than a predetermined brightness, when the 3D depth is determined to be strong, if the surrounding area is dark and the backlight of the display section 17 is illuminated, the display information can be clearly recognized because the display information is shown with a strong 3D depth. Therefore, 3D display can be used effectively.

In a case where the surrounding brightness is brighter than a predetermined brightness, when the 3D depth is determined to be strong, if the display section 17 has a characteristic in which the display information is clearly recognized when the surrounding area is bright, the 3D display can be used effectively.

Whether or not the 3D depth is zero is determined based on the surrounding brightness, and when the 3D depth is zero, the display information is shown in 2D with a 3D depth of zero. As a result, whether to show the display information in 3D or in 2D is appropriately determined based on the surrounding brightness.

The 3D depth is determined to be zero when the surrounding brightness is brighter than a predetermined brightness. As a result, in a case where the display section 17 has a characteristic in which the display information cannot be clearly recognized when the surrounding area is bright, unnecessary 3D display can be eliminated.

The 3D depth is determined to be zero when the surrounding brightness is darker than a predetermined brightness. As a result, in a case where the display section 17 has a characteristic in which the display information cannot be clearly recognized when the surrounding area is dark, unnecessary 3D display can be eliminated.

The 3D depth is determined based on the brightness of the display section 17, and display information is shown in the display section 17 with the decided 3D depth. As a result, the present invention is highly effective in practical use in that suitable display control is actualized based on the brightness of the display section 17.

Whether or not to perform control of the 3D depth based on the brightness of the display section 17 is judged on the basis of the brightness of the surrounding area, and when a judgment is made to perform the control, the 3D depth is determined based on the brightness of the display section 17. As a result, the display information is shown with a suitable 3D depth based on the brightness of the surrounding area and the brightness of the display section 17.

A judgment is made to perform control of the 3D depth based on the brightness of the display section 17 when the brightness of the surrounding area is darker than a predetermined brightness. As a result, in a case where the brightness of the display section 17 has a greater effect on recognizability of the display information when the surrounding area is dark compared to when the surrounding area is bright, the display information can be shown with a suitable 3D depth based on the brightness of the display section 17.

According to the above-described embodiment, regarding the relationship between the "surrounding brightness" and the "3D depth", instances in which the 3D depth becomes stronger as the surrounding becomes darker and, conversely, instances in which the 3D depth becomes stronger as the surrounding becomes brighter are described. However, the relationship between the "surrounding brightness" and the "3D depth" is not limited to those according to the embodiment. Various situations may be taken into consideration.

For example, when the surrounding area is dark and the display section 17 is backlit by the display illuminating section 20, the user can clearly recognize the display information. However, when the backlight illumination is too bright, the user cannot clearly recognize the display information because of the glare. Therefore, the user tends to view the screen from a distance. Also, when the surrounding area is bright, the content on the screen becomes difficult to see and so the user tends to view the screen at a closer distance. In such cases, the 3D depth may be made stronger when the screen is viewed from a distance and made weaker when the screen is viewed at a closer distance. Conversely, when the screen is viewed from a distance, the 3D depth may be made weaker or 2D display may be performed, and when the screen is viewed at a closer distance, the 3D depth may be made stronger.

According to the above-described embodiment, display information distributed from the information distributing device 4, display information (television programs) transmitted from the television station 5, text, menus, and the like are given as the types of display information shown in the display section 17. However, the display information is not limited thereto. The display information may be other types of display information shown in the display section 17, such as display information (image) imaged by an imaging means should the mobile phone 1 include an imaging means, various setting screens, a volume-setting screen during playback of moving images, and the like.

According to the above-described embodiment, display information stored in the storage section 13 are given as the display information shown in the display section 17. However, the display information is not limited thereto. The display information may be other display information shown in the display section 17, such as display information distributed from the information distributing device 4 which is successively shown while being received (streaming playback), display information (television programs) transmitted from the television station 5 which is successively shown while being received, and the like.

In the above-described embodiment, a method is described in which 3D display information is shown in 3D by display information for the right eye and display information for the left eye based on the 3D depth being simultaneously shown, and a parallax barrier in accordance with the 3D depth being generated in the surface layer of the display section 17 to enable the display information to be correctly viewed in 3D. However, another 3D display method may be used, such as a method in which 3D display is performed by a visual effect that makes an object in display information appear three-dimensional being applied to the object.

According to the above-described embodiment, when actual data having the determined 3D depth is not stored, actual data having another 3D depth is converted to actual data having the determined 3D depth. However, actual data having the determined 3D depth may be requested to and received from the information distributing device 4 and received.

According to the above-described embodiment, the brightness of the display section 17 is detected based on the illumination state of the display illuminating section 20. However, another detecting method may be used in which a luminance sensor (luminometer) is provided near the display section 17 and the brightness on the actual screen is detected.

In the operational flow shown in FIG. 7, the 3D depth determination processing (Step A9) and the display processing (Step A10) are performed when the display information displaying operation is performed (YES at Step A7). However, the above-described 3D depth determination processing and display processing may be performed when, for example, the power-ON process is performed (YES at Step A17), when the setting operation is performed (YES at Step A4), when an incoming call is detected (YES at Step A14), or when another operation is performed (YES at Step A20), and after the 3D depth is determined, the display control of display information shown at the time may be performed.

Moreover, the storage section 13 may be another external storage device such as a memory card or an external hard disk, and the display section 17 may be another external display device such as an external monitor. In addition, the terminal device is not limited to a mobile phone. The present invention can be applied to another terminal device such as a personal computer, a personal digital assistant (PDA), a digital camera, and a music player. Also, the terminal device is not limited to a folding-type. The casing structure thereof may be a straight-type, a sliding-type, and a rotating-type.

Furthermore, the "devices" and "units" according to the above-described embodiment are not limited to a single-casing structure and may be separated into a plurality of casings by function. Also, the steps in the above-described flowcharts are not limited to processing performed in time series. A plurality of steps may be performed in parallel. Alternatively, the steps may be performed individually and independently.

While the present invention has been described with reference to the preferred embodiments, it is intended that the invention be not limited by any of the details of the description therein but includes all the embodiments which fall within the scope of the appended claims.

What is claimed is:

1. A terminal device that three-dimensionally shows display information in a display section, comprising:
    a luminance sensor that detects brightness of surrounding area; and
    a central controller that:
    determines a three-dimensional depth indicating a depth of three-dimension or an extent of outward projection of the display information shown in the display section based on the brightness of the surrounding area detected by the luminance sensor; and
    controls the display section to show the display information in the display section with the determined three-dimensional depth,
    wherein, when the brightness of the surrounding area detected by the luminance sensor is darker than a predetermined brightness, the central controller determines the three-dimensional depth of the display information to be a stronger three-dimensional depth than a predetermined three-dimensional depth.

2. The terminal device according to claim 1, wherein, when the brightness of the surrounding area detected by the luminance sensor is brighter than a predetermined brightness, the central controller determines the three-dimensional depth of the display information to be a stronger three-dimensional depth than a predetermined three-dimensional depth.

3. The terminal device according to claim 1, wherein the central controller determines whether or not the three-dimensional depth of the display information is zero based on the brightness of the surrounding area detected by the luminance sensor, and when determined by the central controller that the three-dimensional depth is zero, the central controller controls so as to two-dimensionally show the display information in the display section with the three-dimensional depth of zero.

4. The terminal device according to claim 3, wherein the central controller determines that the three-dimensional depth of the display information is zero when the brightness of the surrounding area detected by the luminance sensor is brighter than a predetermined brightness.

5. The terminal device according to claim 3, wherein the central controller determines that the three-dimensional depth of the display information is zero when the brightness of the surrounding area detected by the luminance sensor is darker than a predetermined brightness.

6. A terminal device that three-dimensionally shows display information in a display section, comprising:
    a display section;
    a central controller that:
    detects brightness of the display section;
    determines a three-dimensional depth indicating a depth of three-dimension or an extent of outward projection of the display information shown in the display section based on the brightness of the display section detected by the central controller; and
    controls the display section to show the display information in the display section with the determined three-dimensional depth; and
    a luminance sensor that detects brightness of a surrounding area
    wherein the central controller:
    judges on the basis of the brightness of the surrounding area detected by the luminance sensor, whether or not to perform control of the three-dimensional depth that is based on the detected brightness of the display section;
    wherein when a judgement is made to perform the control, the central controller determines the three-dimensional depth of the display information based on the detected brightness of the display section, 7. The terminal device according to claim 6, wherein, when the brightness of the surrounding area detected by the luminance sensor is darker than a predetermined brightness, the central controller judges to perform the control of the three-dimensional depth that is based on the detected brightness of the display section.

8. A computer-readable storage medium having stored thereon a program that is executable by a computer to perform a process comprising:

processing for detecting brightness of a surrounding area;

processing for determining a three-dimensional depth indicating a depth of three-dimension or an extent of outward projection of display information shown in a display section based on the detected brightness of the surrounding area; and processing for controlling to show the display information in the displaying section with the determined three-dimensional depth, wherein, when the detected brightness of the surrounding area is darker than a predetermined brightness the three-dimensional depth of the display information is determined to be a stronger three-dimensional depth than a predetermined three-dimensional depth.

9. A computer-readable storage medium having stored thereon a program that is executable by a computer to perform a process comprising:

processing for detecting brightness of a display section;

processing for determining a three-dimensional depth indicating a depth of three-dimension or an extent of outward projection of display information shown in the display section based on the detected brightness of the display section;

processing for controlling to show the display information in the displaying section with the determined three-dimensional depth; and processing for detecting brightness of a surrounding area, wherein whether or not to perform control of the three-dimensional depth that is based on the detected brightness of the display section is judged on the basis of the detected brightness of the surrounding area;

wherein, when a judgment is made to perform the control, the three-dimensional depth of the display information is determined based on the detected brightness of the display section.

* * * * *